(12) United States Patent
Hsu et al.

(10) Patent No.: US 7,746,195 B2
(45) Date of Patent: Jun. 29, 2010

(54) CIRCUIT TOPOLOGY FOR MULTIPLE LOADS

(75) Inventors: Shou-Kuo Hsu, Taipei Hsien (TW);
Hsiao-Chuan Tu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 201 days.

(21) Appl. No.: 11/955,409

(22) Filed: Dec. 13, 2007

(65) Prior Publication Data

US 2009/0108956 A1    Apr. 30, 2009

(30) Foreign Application Priority Data

Oct. 26, 2007    (CN) .................... 2007 1 0202280

(51) Int. Cl.
*H03H 7/38* (2006.01)
(52) U.S. Cl. .................... 333/130; 333/32; 333/33
(58) Field of Classification Search ................ 333/130, 333/100, 125, 32, 33
See application file for complete search history.

(56) References Cited

U.S. PATENT DOCUMENTS 4,356,462 A * 10/1982 Bowman ................ 333/128
5,126,704 A *  6/1992 Dittmer et al. ............ 333/125

* cited by examiner

*Primary Examiner*—Robert Pascal
*Assistant Examiner*—Kimberly E Glenn
(74) *Attorney, Agent, or Firm*—Frank R. Niranjan

(57) ABSTRACT

A circuit topology for multiple loads includes a driving terminal, a first node coupled to the driving terminal and a second node via a first branch transmission line, a first receiving terminal which is a test point configured to detect errors of the circuit topology coupled to the first node via a second branch transmission line, a second and a third receiving terminal respectively coupled to the second node via a third branch transmission line and a fourth branch transmission line, wherein the difference between the length of the second branch transmitting line and that of the third branch transmitting line, and the difference between the length of the third branch transmitting line and that of the fourth branch transmitting line are greater than the product of a transmission speed and a rise time of the signal, and a first resistor is connected in the third branch transmission line.

3 Claims, 4 Drawing Sheets

CIRCUIT TOPOLOGY FOR MULTIPLE LOADS

CROSS-REFERENCES TO RELATED APPLICATION

This application is related to a co-pending application entitled "CIRCUIT TOPOLOGY FOR MULTIPLE LOADS", filed on Aug. 14, 2007 with application Ser. No. 11/838,238, and assigned to the same assignee of the present invention.

BACKGROUND OF THE INVENTION

1. Field of the Invention

The present invention relates to a circuit topology, and particularly to a circuit topology for multiple loads on a motherboard.

2. Description of Related Art

With the increasing speeds of integrated circuits (ICs), signal integrity is becoming one of the most pressing problem areas. Many factors, such as the parameters of the electrical elements of the PCB and the layout of the PCB, can affect the signal integrity, or lead to instability of the system, possibly even causing the system to breakdown. Thus, preserving signal integrity has become a key point in the design of a PCB.

Referring to FIG. 3, a conventional circuit topology coupling a driving terminal to four signal receiving terminals is shown. A driving terminal 10 is coupled to four signal receiving terminals 20, 30, 40, and 50 via corresponding transmission lines. The four signal receiving terminals 20, 30, 40, and 50 are connected together in a daisy-chain configuration. The daisy-chain configuration includes three connection points A, B, and C. In this circuit topology, the distance a signal travels from the driving terminal 10 to the signal receiving terminal 30 is greater than the distance the signal travels from the driving terminal 10 to the signal receiving terminals 20, 40, and 50.

Referring to FIG. 4, a graph illustrating signal waveforms 22, 33, 44, and 55 respectively obtained at receiving terminals 20, 30, 40, and 50 using the circuit topology of FIG. 3 is shown. Signals arriving at the receiving terminal 30 reflect back and forth along the transmission line causing "ringing" at receiving terminals 20, 40, and 50.

What is needed, therefore, is a circuit topology which can eliminate the signal reflections and enhance signal integrity.

SUMMARY

An exemplary circuit topology for multiple loads comprises a driving terminal, a first node coupled to the driving terminal via a main transmission line and a second node via a first branch transmission line, a first receiving terminal used as a test point to detect errors of the circuit topology of multiple loads coupled to the first node via a second branch transmission line, a second and a third receiving terminal respectively coupled to the second node via a third branch transmission line and a fourth branch transmission line, wherein the difference between the length of the second branch transmitting line and that of the third branch transmitting line, and the difference between the length of the third branch transmitting line and that of the fourth branch transmitting line are both greater than the product of a transmission speed and a rise time of the signal, and a first resistor is connected in the third branch transmission line.

Other objects, advantages and novel features of the present invention will become more apparent from the following detailed description of preferred embodiments when taken in conjunction with the accompanying drawings, in which:

DETAILED DESCRIPTION

Figure 1:
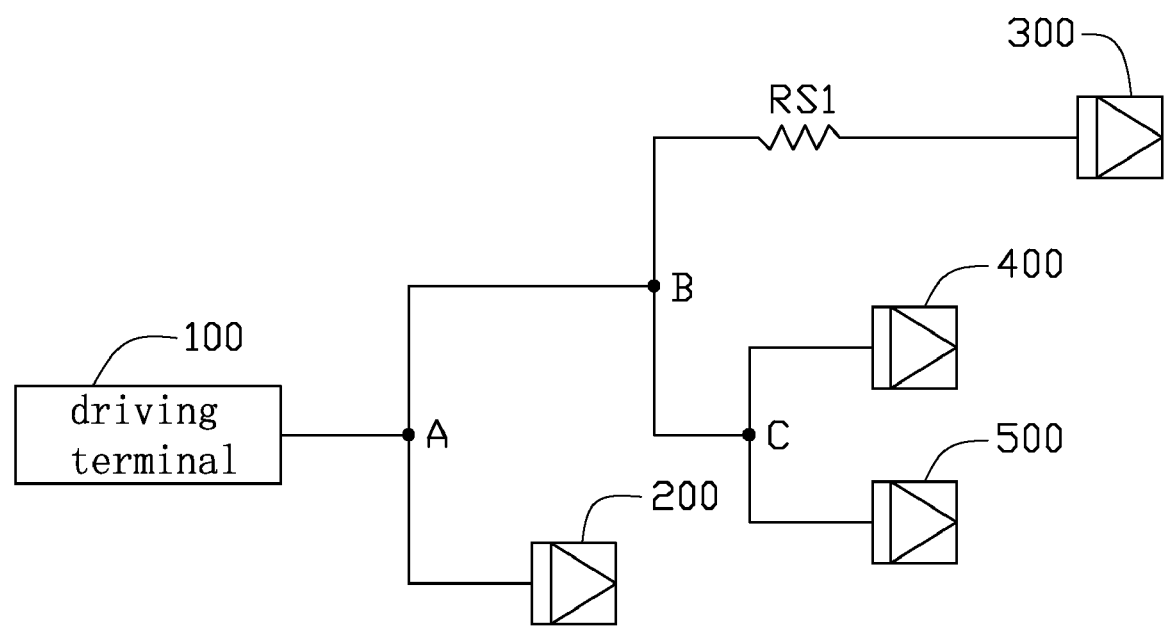
FIG. 1 is a block diagram of a circuit topology for multiple loads in accordance with an embodiment of the present invention.

Referring to FIG. 1, a circuit topology for multiple loads in accordance with an embodiment of the present invention is shown. A driving terminal 100 is coupled to a first node A via a main transmission line. The first node A is coupled to a second node B and a first signal receiving terminal 200 via a first branch transmission line and a second branch transmission line respectively. The second node B is coupled to a second signal receiving terminal 300 via a third branch transmission line. The second node B is further coupled to a third node C via a fourth branch transmission line. The third node C is coupled to a third signal receiving terminal 400 and a fourth signal receiving terminal 500 via a fifth branch transmission line and a sixth branch transmission line respectively. A first resistor RS1 is connected in the third branch transmission line. The resistance of the first resistor RS1 is chosen to accomplish impedance matching of the third branch transmission line.

In this embodiment, the difference between the length of the second branch transmitting line and that of the fourth branch transmitting line is greater than the product of a transmission speed and a rise time of the signal. The difference between the length of the fourth branch transmitting line and that of the fifth branch transmitting line is greater than the product of the transmission speed and the rise time of the signal. The difference between the length of the fifth branch transmitting line and the length of the sixth branch transmitting is no more than the product of a transmission speed and a rise time of the signal. The first receiving terminal 200 is a test point configured to detect errors of the circuit topology for multiple loads.

When the driving terminal 100 sends signals to the signal receiving terminals 200, 300, 400 and 500, the first resistor RS1 weakens the signals transmitted to the second signal receiving terminal 300 and enhances the signals arriving at the third node C. Therefore signal reflections from the second signal receiving terminal 300 reduce, and signal integrity at the third and fourth signal receiving terminals 400 and 500 is improved. Because the first signal receiving terminal 200 is a test point, it is not necessary to consider the signal integrity thereat, therefore, there is no resistor set in the first branch transmitting line.

Figure 2:
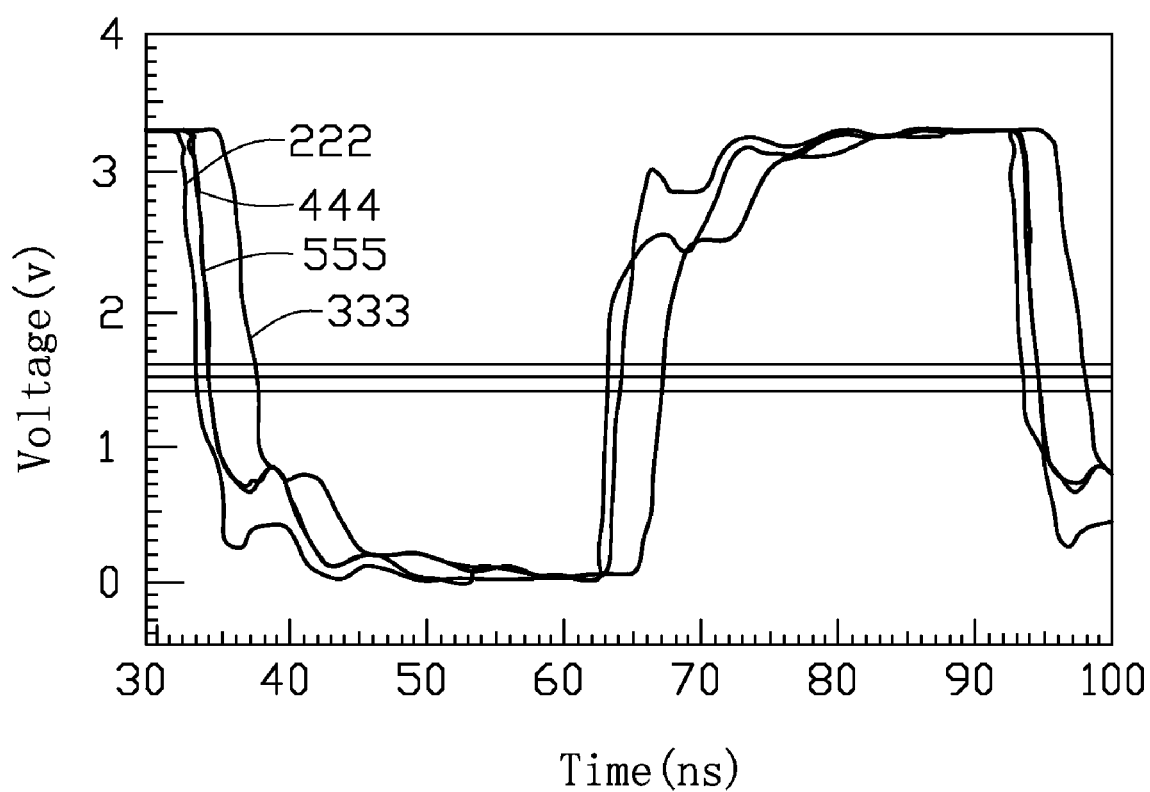
FIG. 2 is a comparative graph showing signal waveforms obtained at each signal receiving terminal using the circuit topology of FIG. 1.
Figure 3:
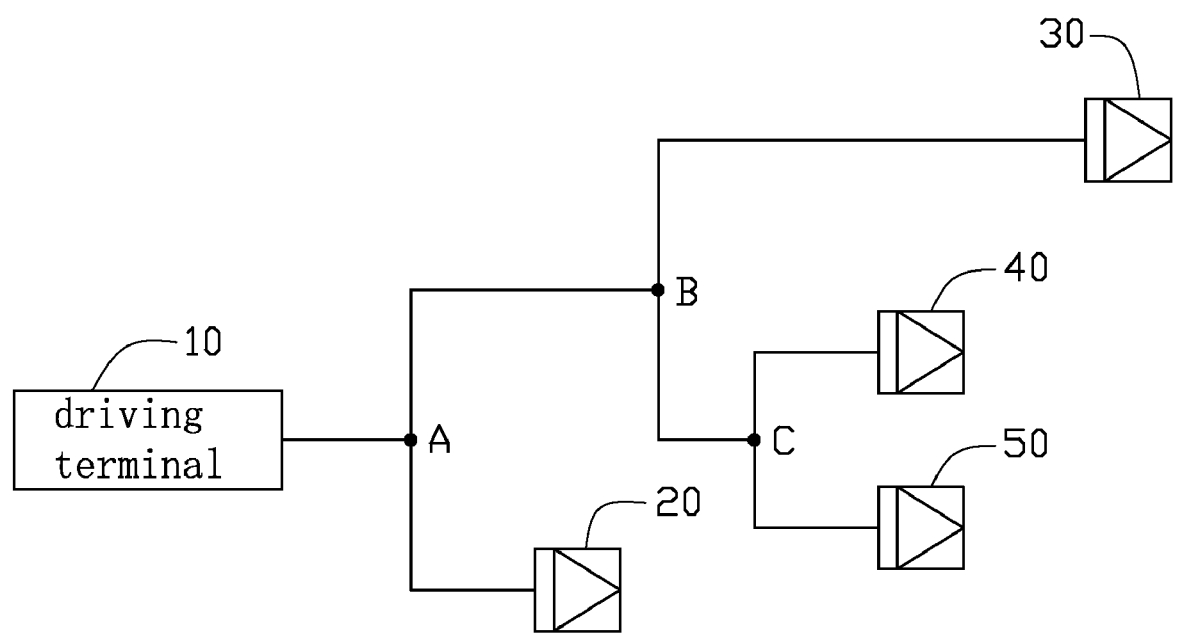
FIG. 3 is a block diagram of a conventional circuit topology coupling a driving terminal to four signal receiving terminals.
Figure 4:
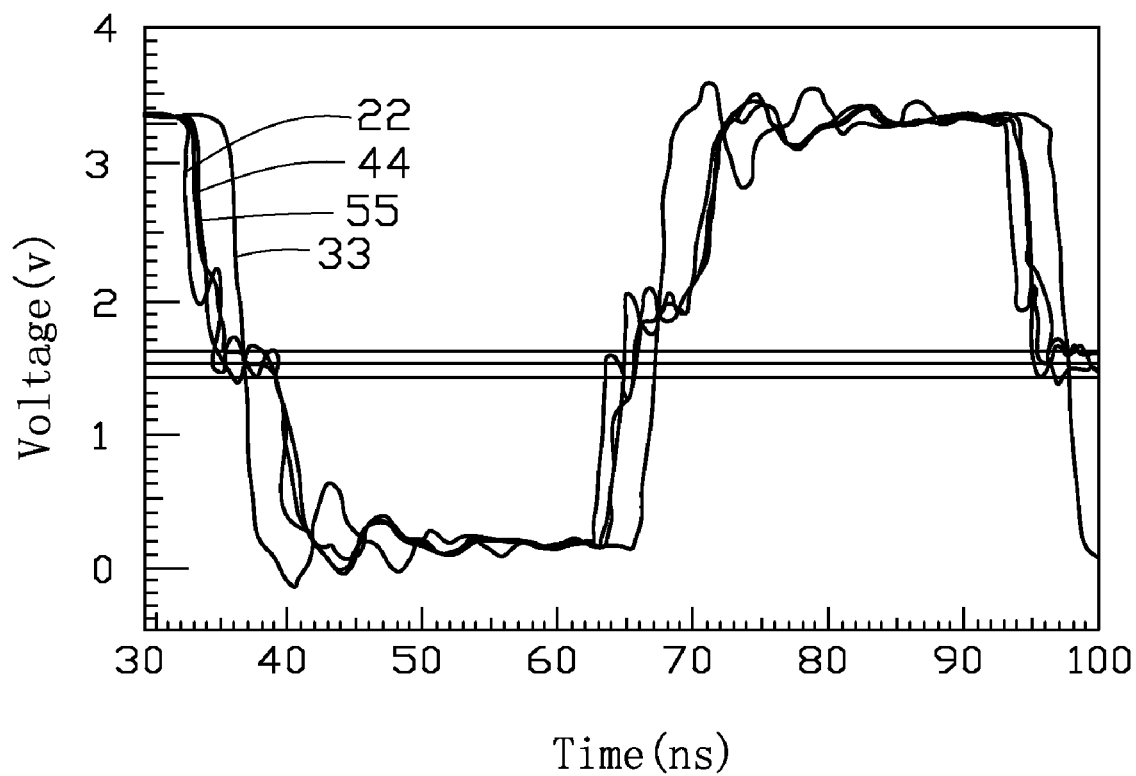
FIG. 4 is a comparative graph showing signal waveforms obtained at each signal receiving terminal using the circuit topology of FIG. 3.

FIG. 2 is a graph showing signal waveforms obtained at each signal receiving terminal 200, 300, 400, and 500 using the circuit topology of FIG. 1. Signal waveforms 222, 333, 444, and 555 are corresponding to signal receiving terminals 200, 300, 400, and 500. Compared with FIG. 2, it can be seen that signal reflections are reduced and signal integrity is improved except at the first signal receiving terminal 200.

In the above-described circuit topology of the embodiment of the present invention, the driving terminal 100, and the signal receiving terminals 200, 300, 400, and 500 are used as examples. In other embodiments, the circuit topology with a resistor connected to the receiving terminal to which a signal travels a greater distance and without a resistor connected to the receiving terminal which has no function of data transmission may be used for any other multiple loads on a PCB.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A circuit topology for multiple loads comprising: a driving terminal; a first node coupled to the driving terminal via a main transmission line; a second node coupled to the first node via a first branch transmission line; a first receiving terminal coupled to the first node via a second branch transmission line; a second receiving terminal coupled to the second node via a third branch transmission line; a third receiving terminal coupled to the second node via a fourth branch transmission line, wherein a difference between a length of the second branch transmission line and that of the third branch transmission line is greater than a product of a transmission speed and a rise time of a signal, the difference between the length of the third branch transmission line and that of the fourth branch transmission line is greater than the product of the transmission speed and the rise time of the signal; and a first resistor connected in the third branch transmission line.

2. The circuit topology for multiple loads as claimed in claim 1, further comprising a third node between the second node and the third receiving terminal, the third node coupled to a fourth terminal via a fifth branch transmission line, wherein a difference between a length of a branch transmission line from the third receiving terminal to the third node and a length of the fifth branch transmission line is no more than a product of the transmission speed and the rise time of a signal.

3. The circuit topology for multiple loads as claimed in claim 1, wherein a resistance of the first resistor is set for impedance matching of the third branch transmission line.

* * * * *